US006987858B2

(12) United States Patent
Aoki et al.

(10) Patent No.: US 6,987,858 B2
(45) Date of Patent: Jan. 17, 2006

(54) SIGNAL PROCESSING METHOD, PROGRAM, AND SIGNAL PROCESSING APPARATUS

(75) Inventors: Takamitsu Aoki, Hamamatsu (JP); Kei Nakayama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 230 days.

(21) Appl. No.: 10/027,490

(22) Filed: Dec. 21, 2001

(65) Prior Publication Data

US 2002/0080981 A1 Jun. 27, 2002

(30) Foreign Application Priority Data

Dec. 22, 2000 (JP) ............................ 2000-389785

(51) Int. Cl.
*H04B 1/00* (2006.01)

(52) U.S. Cl. ............................ 381/119; 381/104; 369/4

(58) Field of Classification Search ................ 381/119, 381/104, 109, 56, 58; 387/107; 700/94; 369/4

See application file for complete search history.

(56) References Cited

U.S. PATENT DOCUMENTS 5,402,501 A * 3/1995 Silfvajt et al. .............. 381/119
5,444,676 A * 8/1995 Balsamo et al. ............... 369/4
5,778,417 A * 7/1998 Kentish et al. ............. 711/100
5,848,146 A * 12/1998 Slattery ................. 379/406.01
5,852,800 A * 12/1998 Modeste et al. ......... 704/270.1
5,959,610 A * 9/1999 Silfvast ...................... 345/156

FOREIGN PATENT DOCUMENTS

JP 9312536 12/1997
JP 2000267677 9/2000

OTHER PUBLICATIONS

Midiman Delta DiO 2496 User's Manual. Midiman/M-Audio [online]. Oct. 7, 1999 [date in pdf document summary] [retrieved on Jul. 12, 2004]. Retrieved from the Internet: <URL: http://web.archive.org/web/20000930180657/www.midiman.net/manuals/pdf/delt_dio.pdf>.*

8-Bus Owner's Manual [online]. Mackie Designs, Inc. Part No. 820-007-00 V2.3 Aug. 1999 [retrieved Feb. 11, 2005]. Retrieved from the Internet: <URL: http://www.mackie.com/pdf/8bus_om.pdf>. pp. 4, 5, 20, 21, 29, 70, 71.*

Digital Audio Mixer DMX-R100 Operating Instruction Manual [online]. Sony Corp. 1999 [retrieved Feb. 11, 2005]. Retrieved from the Internet: <URL: http://web.interware.hu/stugen/ftp/sony/OpManual.pdf>. pp. 10-12, 19, 20, 37, 67, 68, 94, 103, 104.*

Digital Audio Mixing Console OXF-R3 Operation Manual [online]. Sony Corp. 2001 [retrieved Feb. 11, 2005]. Retrieved from the Internet: <URL: http://bssc.sel.sony.com/Professional/docs/manuals/oxf-r3_v3_op_man_rev4.pdf>. pp. 4-15 to 4-17, 6-44 to 6-46.*

* cited by examiner

*Primary Examiner*—Xu Mei
(74) *Attorney, Agent, or Firm*—Morrison & Foerster LLP

(57) ABSTRACT

A signal processing method is provided, which makes it possible to quickly find the cause of clipping or the like. A sound signal that is input is subjected to processing of adjusting at least one of sound volume and sound quality. It is determined whether the input sound signal satisfies a condition that the level of the sound signal exceeds a predetermined value at a plurality of metering points on a signal path along which the input sound signal is transmitted. An alarm is displayed on a screen when it is determined that the input sound signal satisfies the condition at at least one of the plurality of metering points.

4 Claims, 10 Drawing Sheets

SIGNAL PROCESSING METHOD, PROGRAM, AND SIGNAL PROCESSING APPARATUS

BACKGROUND OF THE INVENTION

1. Field of the Invention

This invention relates to a signal processing method, a program for implementing the method, and a signal processing apparatus that can be suitably used for mixing sound signals.

2. Description of the Related Art

Conventionally, there are known mixing apparatuses (signal processing apparatuses) which synthesize sound signals of multiple input channels. Many of these mixing apparatus have a clip lamp for warning of an excessive level (hereinafter referred to as "clipping") provided for the respective ones of input channels and mixing outputs. In recent years, a digital mixing apparatus has been developed which has AD converters provided for respective input channels and DA converters provided for respective output channels such that digital processing is performed at all parts other than inputs and output parts.

In the digital mixing apparatus, however, sound signals are rapidly deteriorated by clipping. Accordingly, the digital mixing apparatus is required to quickly find the cause of clipping, etc. and take proper measures.

SUMMARY OF THE INVENTION

It is therefore an object of the present invention to provide a signal processing method, a program for implementing the method, and a signal processing apparatus that make it possible to quickly find the cause of clipping or the like.

To attain the above object, the present invention provides a signal processing method comprising an adjusting step of subjecting a sound signal that is input, to processing of adjusting at least one of sound volume and sound quality, a condition determining step of determining whether the input sound signal satisfies a condition that a level of the sound signal exceeds a predetermined value at a plurality of metering points on a signal path along which the input sound signal is transmitted, and an alarm display step of displaying an alarm when the condition determining step determines that the input sound signal satisfies the condition at at least one of the plurality of metering points.

In a typical preferred form of the present invention, the signal processing method further comprises a mixing step of mixing the sound signal subjected to the adjusting processing and outputting the mixed sound signal.

In a typical preferred form of the present invention, the sound signal comprises a plurality of sound signals input for a plurality of channels, respectively, and the plurality of metering points are provided on a signal path of each of the plurality of channels along which a corresponding one of the input sound signals is transmitted.

In a typical preferred form of the present invention,the plurality of metering points on the signal path along which the input sound signal is transmitted include at least first and second metering points, the method further comprising a first display step of displaying a level of the sound signal at the first metering point on a first screen, and a second display step of displaying a level of the sound signal at the second metering point on a second screen, and the alarm is displayed on the first and second screen by the alarm display step.

To attain the above object, the present invention also provides a program executed by a computer, comprising an adjusting module for subjecting a sound signal that is input, to processing of adjusting at least one of sound volume and sound quality, a condition determining module for determining whether the input sound signal satisfies a condition that a level of the sound signal exceeds a predetermined value at a plurality of metering points on a signal path along which the input sound signal is transmitted, and an alarm display module for displaying an alarm when the condition determining module determines that the input sound signal satisfies the condition at at least one of the plurality of metering points.

To attain the above object, the present invention further provides a signal processing apparatus comprising an adjusting device that subjects a sound signal that is input, to processing of adjusting at least one of sound volume and sound quality, a condition determining device that determines whether the input sound signal satisfies a condition that a level of the sound signal exceeds a predetermined value at a plurality of metering points on a signal path along which the input sound signal is transmitted, and an alarm display device that displays an alarm when the condition determining device determines that the input sound signal satisfies the condition at at least one of the plurality of metering points.

According to the above arrangement of the present invention, if the condition that the level of the sound signal exceeds the predetermined value is satisfied at any of the metering points, an alarm is indicated correspondingly to an channel to which the metering point belongs. This makes it possible to quickly find the cause of clipping or the like.

The above and other objects, features, and advantages of the invention will become more apparent from the following detailed description taken in conjunction with the accompanying drawings.

DETAILED DESCRIPTION OF THE PREFERRED EMBODIMENTS

The present invention will be described in detail with reference to the drawings showing an embodiment thereof.

Figure 1:
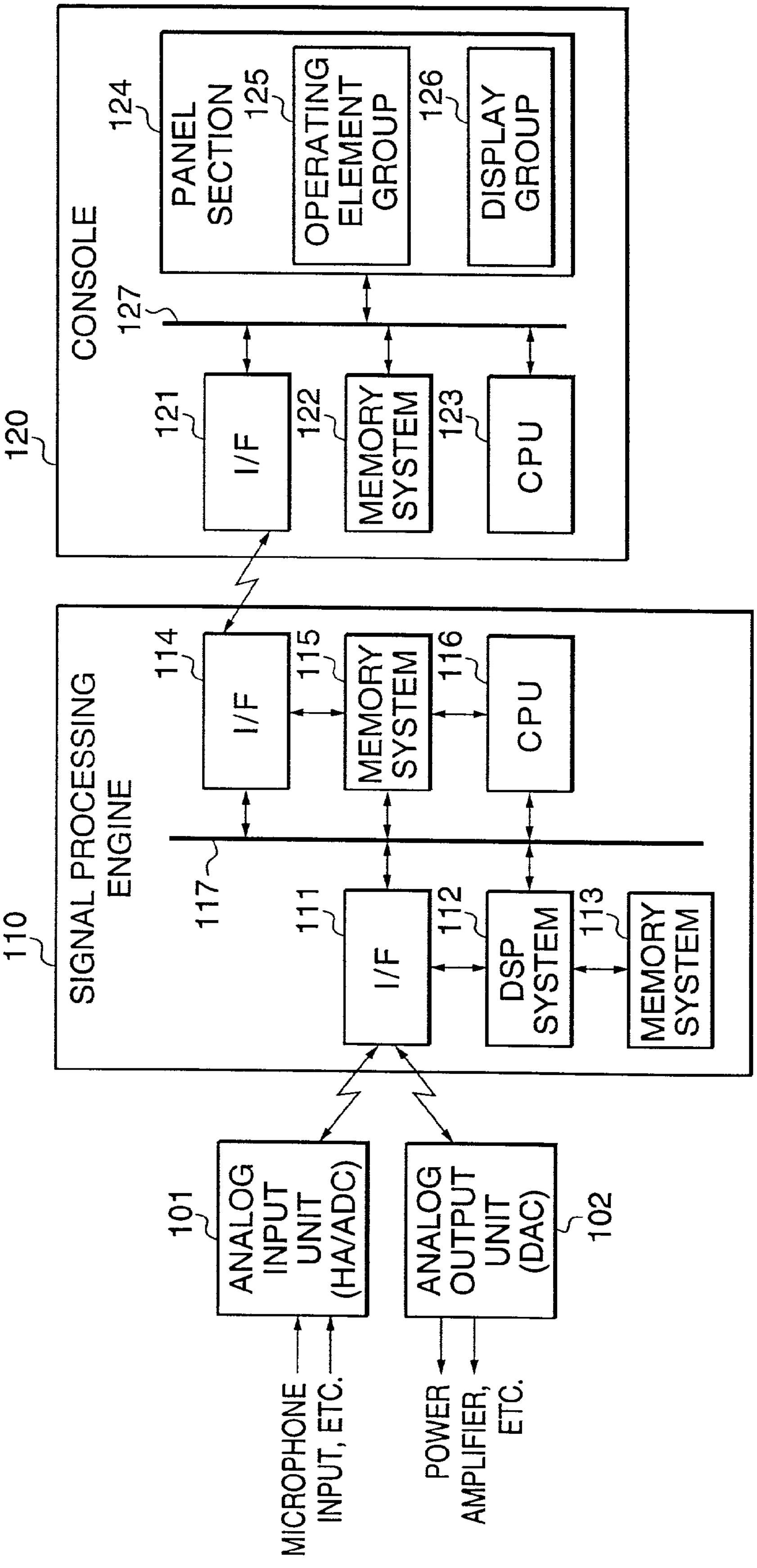
FIG. 1 is a schematic block diagram showing the arrangement of a digital mixing apparatus as a signal processing apparatus according to an embodiment of the present invention.

Referring to FIG. 1, there is shown the construction of a digital mixing apparatus as a signal processing apparatus according to an embodiment of the present invention.

1. Construction of Hardware

First, there will now be described the construction of hardware of the digital mixing apparatus according to the present embodiment with reference to FIG. 1.

In FIG. 1, an analog input unit 101 is comprised of a plurality of head amplifiers for amplifying microphone inputs from a plurality of channels, and a plurality of AD converters that convert output signals from the head amplifiers into digital signals while multiplexing them. An analog output unit 102 is comprised of a plurality of DA converters that convert the multiplexed digital signals of plural output channels into analog signals of the respective channels.

The output signals from the analog output unit 102 are supplied mainly to a power amplifier that drives a speaker. A signal processing engine 110 carries out a mixing process, an effecting process, and the like on input signals supplied from the analog input unit 101, and supplies the resulting signals to the analog output unit 102. A console 120, which is operated by a user such as a mixing engineer, controls the modes of the mixing process, the effecting process, etc. carried out by the signal processing engine 110.

A description will now be given of a suitable arrangement of the above-mentioned components in a concert hall. First, the analog input unit 101 is installed at a position close to performers, e.g. at the backstage in order to reduce the length of a microphone cable that transmits feeble analog signals. The console 120 is installed in a mixing booth located at the center of the seats or the like so as for the user to operate the console 120 while listening to sounds. Relatively loose limitations are imposed upon the installment locations of the analog output unit 102 and the signal processing engine 110, since the analog output unit 102 handles relatively high-level analog signals and the signal processing engine 110 handles only digital signals. If these components are installed in the mixing booth, however, it is unavoidable to broaden the mixing booth and therefore necessitate reducing the number of seats. Therefore, it is preferable to install the components at the backstage or the like.

In the signal processing engine 110, an interface circuit 111 transmits and receives digital signals to and from the analog input unit 101 or the analog output unit 102 via a coaxial cable or the like. A DSP system 112 carries out a mixing process, an effecting process, and the like on input digital signals supplied from the analog input unit 101 via the interface circuit 111, and supplies the resulting signals to the analog output unit 102 via the interface circuit 111. A memory system 113 is used as a program memory and a data memory for the DSP system 112.

A CPU 116 receives commands from the console 120 via an interface circuit 114 according to a control program stored in a memory system 115, and sets the contents of the memory system 113, i.e. an algorithm and parameters executed by the DSP system 112. The CPU 116 supplies information on the setting conditions of the algorithm in the DSP system 112 and monitor signals or the like for monitoring sound signals from the respective components to the console 120 via the interface circuit 114.

In the console 120, a panel section 124 is comprised of an operating element group 125 composed of a fader, a switch, and the like, and a display group 126 that displays various kinds of information for the user. The operating element group 125 is provided with a keyboard and a mouse for use in inputting characters in order to enable window operations as is the case with ordinary personal computers. A CPU 123 transmits the contents of operations of the operating element group 125 to the signal processing engine 110 via an interface circuit 121, and displays various kinds of data supplied from the signal processing engine 110 on the display group 126. A memory system 122 is used as a program memory and a data memory for the CPU 123.

2. Algorithm

Figure 2:
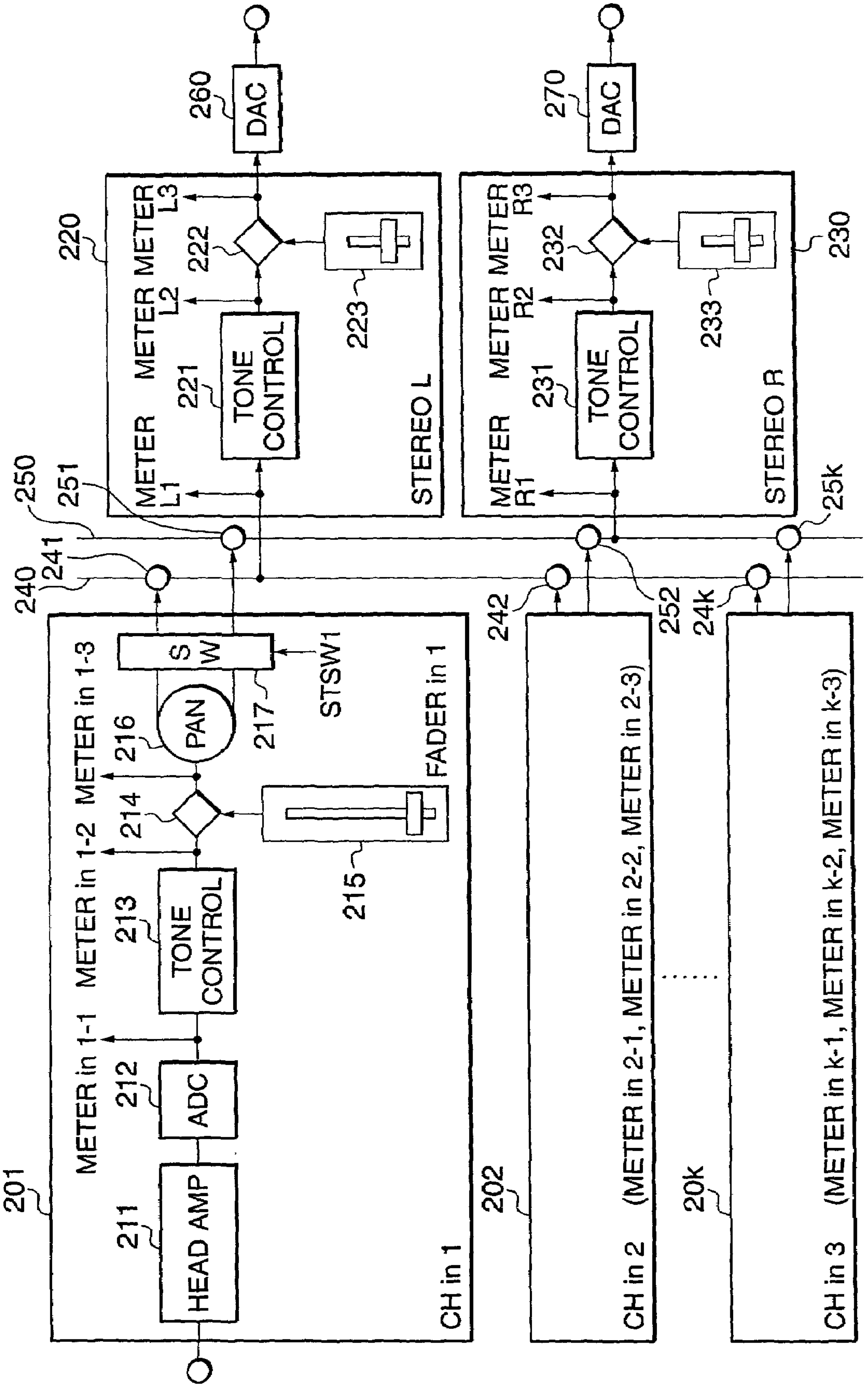
FIG. 2 is a schematic block diagram showing an algorithm that is executed according to the embodiment.

Referring next to FIG. 2, a description will be given of the algorithm employed in the present embodiment. This algorithm is implemented by the hardware shown in FIG. 1 and software. In FIG. 2, input channel processing sections 201, 202, . . . , 20*k* carry out an effect imparting process, a volume controlling process, a panning process (distribution of sound signals into right and left output channels), and the like with respect to the respective ones of the first, second, . . . , and the k th input channels. In the input channel processing section 201, a head amplifier 211 and an AD converter section 212 are equivalent to the analog input unit 101 in FIG. 1.

A tone control section 213 provides control of frequency characteristics, etc. of sound signals. The frequency characteristics, etc. are designated by an operating element of the operating element group 125 in the console 120, and a filtering process or the like based on the operation of the operating element is carried out by the DSP system 112 in the signal processing engine 110. A fader operating element 215 is included in the operating element group 125. A multiplier section 214 multiplies a control input of the fader operating element 215 by an output signal from the tone control section 213. The multiplication of the multiplier section 214 is implemented by calculation in the DSP system 112.

A panning processing section 216 controls the distribution ratio of sound signals in the right and left output channels. A stereo switch 217 switches the way of outputting sound signals between stereo outputting and monaural outputting. It should be noted that the monaural outputting means setting the distribution ratio of sound signals in the right and left output channels to 1:1 irrespective of the setting conditions of the panning processing section 216. The setting of the distribution ratio of sound signals in the panning processing section 216 and the switching of the way of outputting in the stereo switch 217 are carried out by operating elements included in the operating element group 125 as is the case with the designation of the frequency characteristics, etc. by the tone control section 213. The control of the setting of the distribution ratio of sound signals in the panning processing section 216 and the switching of the way of outputting in the stereo switch 217 is implemented by calculation in the DSP system 112. It should be noted that the arrangements of the other input channel processing sections 202, . . . , 20*k* are identical with the arrangement of the input channel processing section 201 described above in detail.

A left bus line 240 synthesizes left output signals from the input channel processing sections 201, 202, . . . , 20*k* by means of adder sections 241, 242, . . . , 24*k*. Similarly, a right bus line 250 synthesizes right output signals from the input channel processing sections 201, 202, . . . , 20*k* by means of adder sections 251, 252, . . . , 25*k*. The synthesis of the output signals by the respective bus lines 240, 250 is implemented by calculation in the DSP system 112. A left output channel processing section 220 carries out an effect imparting process and a sound volume controlling process for a signal resulting from the synthesis by the left bus line 240, and supplies the resulting signal to a DA converter section 260 for the left output channel. On the other hand, a right output channel processing section 230 carries out an effect imparting process and a sound volume controlling process for a signal resulting from the synthesis by the right bus line 250, and supplies the resulting signal to a DA converter section 270 for the right output channel. The DA converter sections 260, 270 are equivalent to the analog output unit 102 in FIG. 1.

In the left output channel processing section 220, a tone control section 221 controls the frequency characteristics, etc. of the left output signal as is the case with the tone control section 213 in the input channel processing section 201. The frequency characteristics are designated by an operating element included in the operating element group 125 in the console 120, and a filtering process, etc. based on the operation of the operating element is carried out by the DSP system 112 in the signal processing engine 110. A fader operating element 223 is included in the operating element group 125 as is the case with the above-mentioned fader operating element 215. A multiplier section 222 multiplies a control input of the fader operating element 223 by an output signal from the tone control section 221. The multiplication of the multiplier section 222 is implemented by calculation in the DSP system 112. Similarly to the left output channel processing section 220, a right output channel processing section 230 is comprised of a tone control section 231, a multiplier section 232, and a fader operating element 233.

In the input channel processing section 201, the level of a sound signal is sequentially metered at an input end of the tone control section 213, an input end of the multiplier section 214, and an output end of the multiplier section 214. These points of metering will be called metering points MP1, MP2, MP3. In the left output channel section 220, the level of a sound signal is sequentially metered at an input end of the tone control section 221, an input end of the multiplier section 222, and an output end of the multiplier section 222. These points of metering will be called metering points L1, L2, L3. Likewise, in the right output channel processing section 230, the level of a sound signal is sequentially metered at an input end of the tone control section 231, an input end of the multiplier section 232, and an output end of the multiplier section 232. These points of metering will be called metering points R1, R2, R3.

3. Operation 3.1 Outline of Displaying Process

A description will now be given of the operation of the present embodiment.

Figure 3:
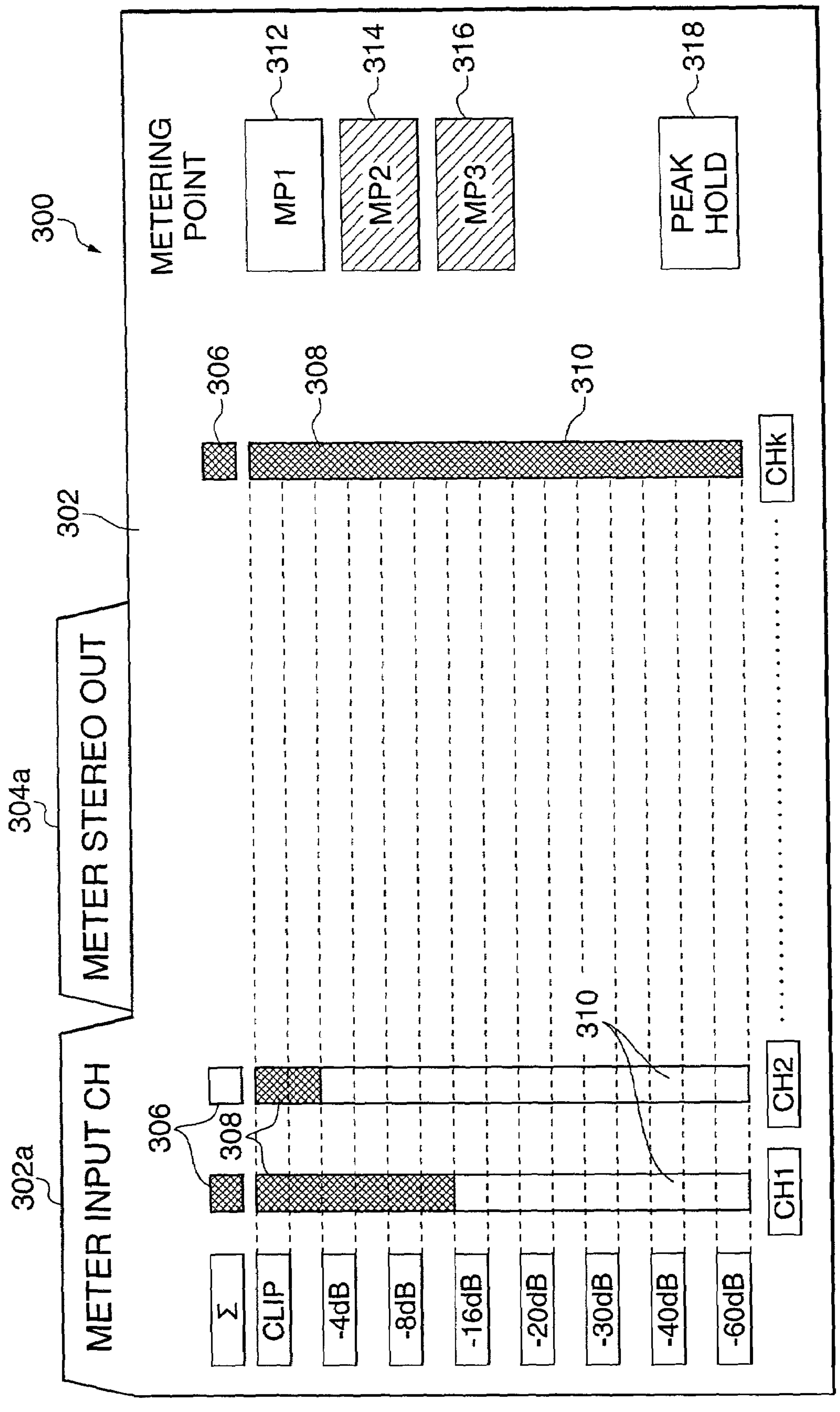
FIG. 3 is a view showing an example of display in an input channel meter window with respect to a metering point MP1.

First, when the digital mixing apparatus is activated and the user performs a predetermined operation by means of the operating element group 125, a meter window 300 as shown in FIG. 3 is displayed on the display group 126. In FIG. 3, the meter window 300 is comprised of an input channel meter window 302 and an output channel meter window 304 with two tabs. Tabs 302*a*, 304*a* are provided at the top of the windows 302, 304, respectively. In the illustrated state, however, the window 304 is not displayed on the display section 126 except for the tab 304*a*.

The input channel meter window 302 is intended to monitor metering points of the input channel processing sections 201, 202, . . . , 20*k*, and a plurality of level meters 310 corresponding to the respective ones of the first, second, . . . , k th channels are displayed in the input channel meter window 302. These level meters 310 are intended to indicate the level at the metering point MP1, MP2, or MP3 in the form of a histogram. Reference numerals 312, 314, 316 denote metering point setting switches provided correspondingly to the metering points MP1, MP2, MP3, respectively. The metering point setting switches 312, 314, 316 are intended to alternatively select one metering point to be monitored in each input channel.

A peak hold switch 318 is provided to set an on-off state representing whether the respective level meters 310 provide a peak hold display or not. The peak hold display means displaying the level of a peak value in each level meter 310 continuously (the display of the peak value may be continued only over a predetermined period of time, or may be continued until any canceling operation such as switching-off of the peak hold switch 318 is carried out). In a normal operating state, the peak hold display is preferably ON. The top of each level meter 310 is especially called a clip display section 308. A Σ display section 306 is provided at the upper side of the clip display section 308.

A detailed description will now be given of the clip display section 308 and the Σ display section 306. If the level of the sound signal at any one metering point selected as the metering point reaches the maximum value, the clip display section 308 of the corresponding level meter 310 is lighted. On this occasion, if the peak hold display is ON, the clip display section 308 is continuously lighted even if the level of the sound signal at the metering point is subsequently lowered. This enables the user to see the metering point at which clipping occurs.

The Σ display section 306 is lighted when clipping occurs at any one metering point of the corresponding input channel. If the peak hold display is ON, the Σ display section 306 is continuously lighted even if the level of the sound signal at the metering point is subsequently lowered. For example, assuming that clipping occurs at the metering point MP3 of the second input channel while the metering point MP1 in each input channel is monitored in the input channel meter window 302, the Σ display section 306 of the second input channel is lighted even if clipping does not occur in any of the level motors 310.

FIG. 3 is based on the above assumption. In FIG. 3, among the metering point setting switches 312, 314, 316 and the peak hold switch 318, the lighted (ON) switches are indicated in white. That is, the metering point MP1 is selected as the metering point by the user, and the peak hold display is ON. In the clip display section 308 and the Σ display section 306 as well, lighted section and areas are indicated in white. In the case of the second input channel (CH2) for example, the clip display section 308 is unlighted. This means that clipping has not occurred at the metering point MP1 of the second input channel after the peak hold display was turned on on the last occasion.

On the other hand, the Σ display section 306 of the second input channel is lighted. This means that clipping has occurred at the metering point MP2 or MP3.

Figure 4:
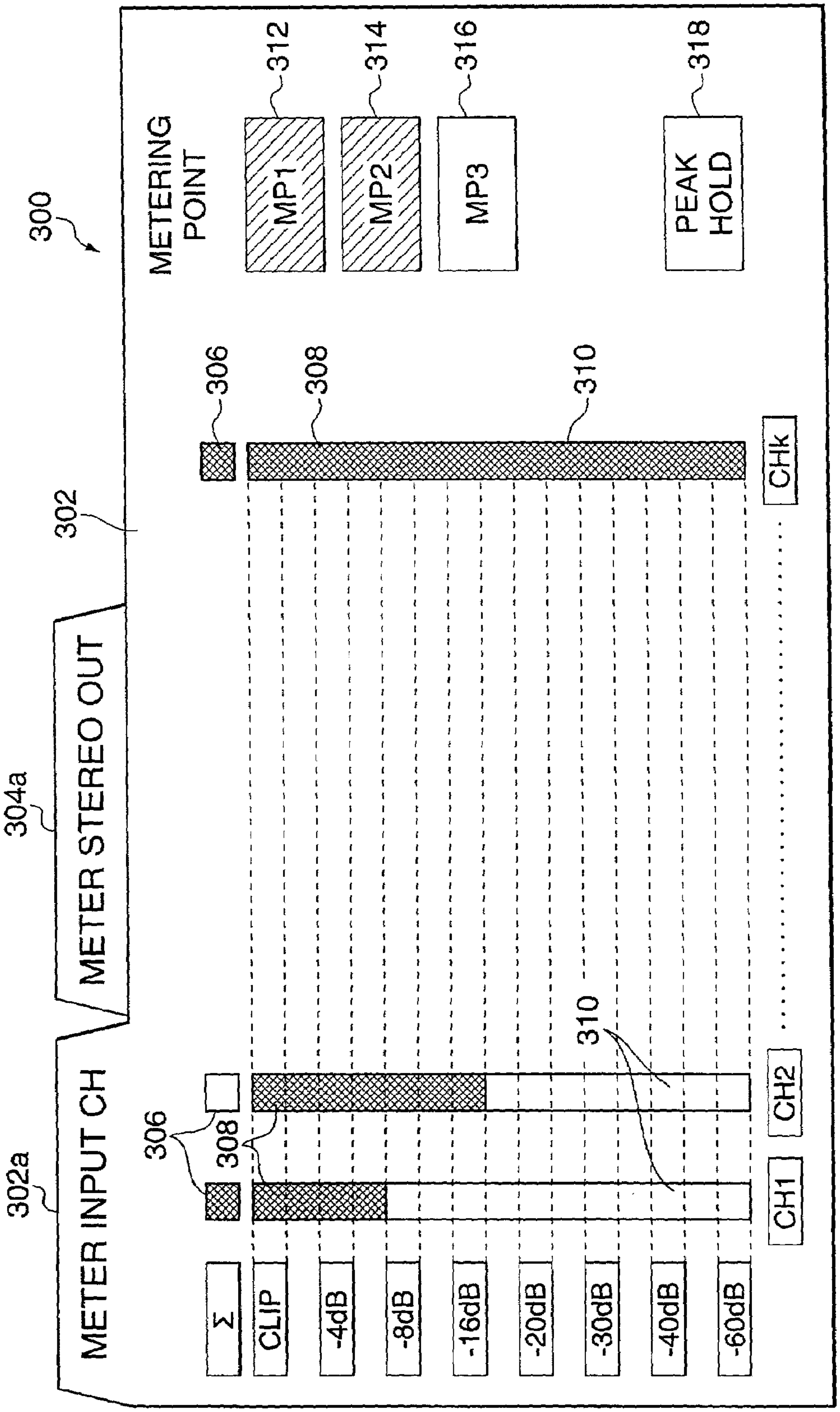
FIG. 4 is a view showing an example of display in an input channel meter window with respect to a metering point MP2.

FIG. 4 shows the input channel meter window 302 in a case where the metering point MP3 is selected as the metering point by the user. In FIG. 4 as well, the clip display section 308 of the second input channel is unlighted.

This means that clipping has not occurred at the metering point MP3 in the second input channel after the peak hold display is turned on on the last occasion.

Figure 5:
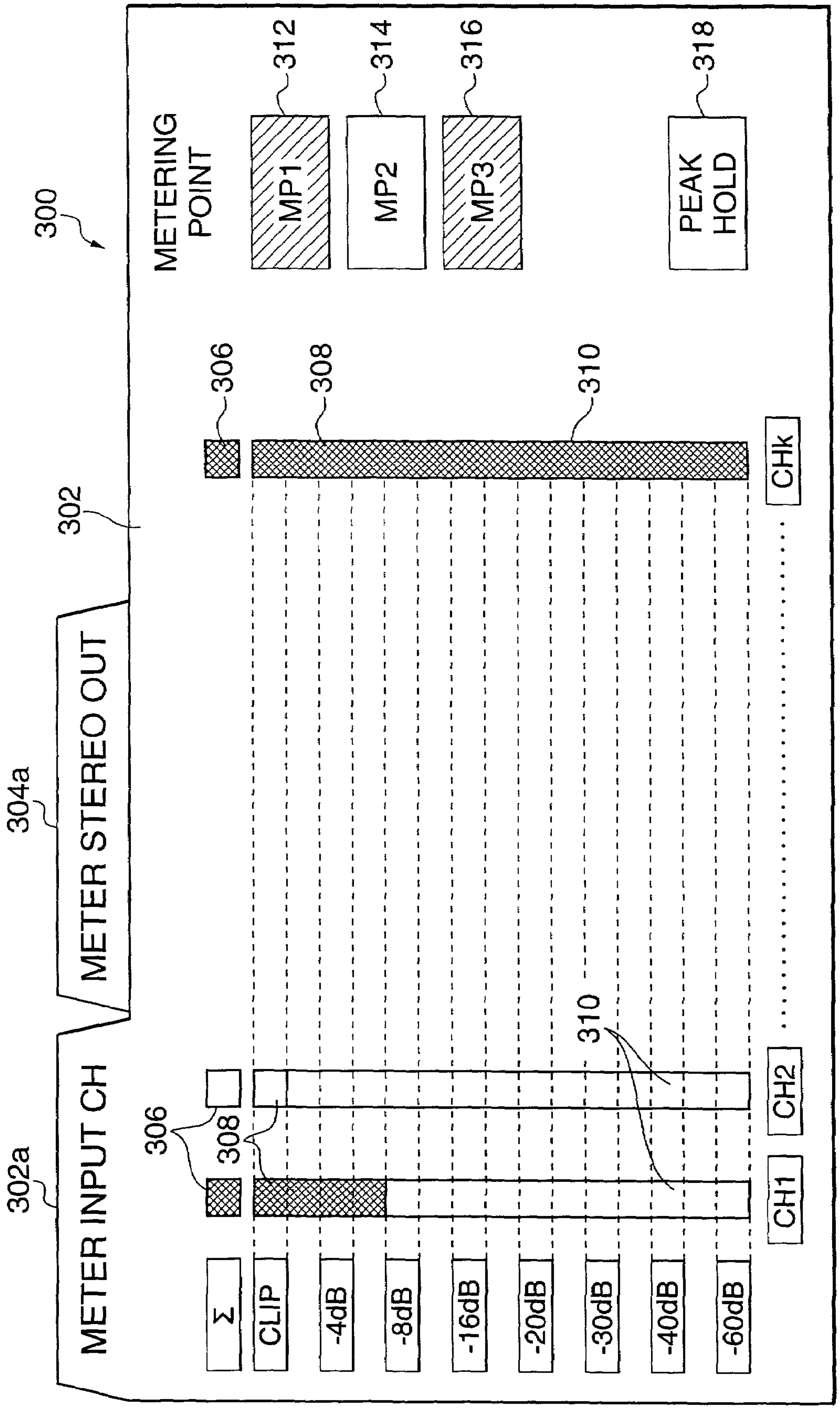
FIG. 5 is a view showing an example of display in an input channel meter window with respect to a metering point MP3.

FIG. 5 shows the input channel meter window 302 in a case where the metering point MP2 is selected as the metering point by the user. In FIG. 5, the clip display section 308 in the second input channel is lighted. It will be learned that the Σ display section 306 in the second input channel is lighted due to clipping at the metering point MP2.

Figure 6:
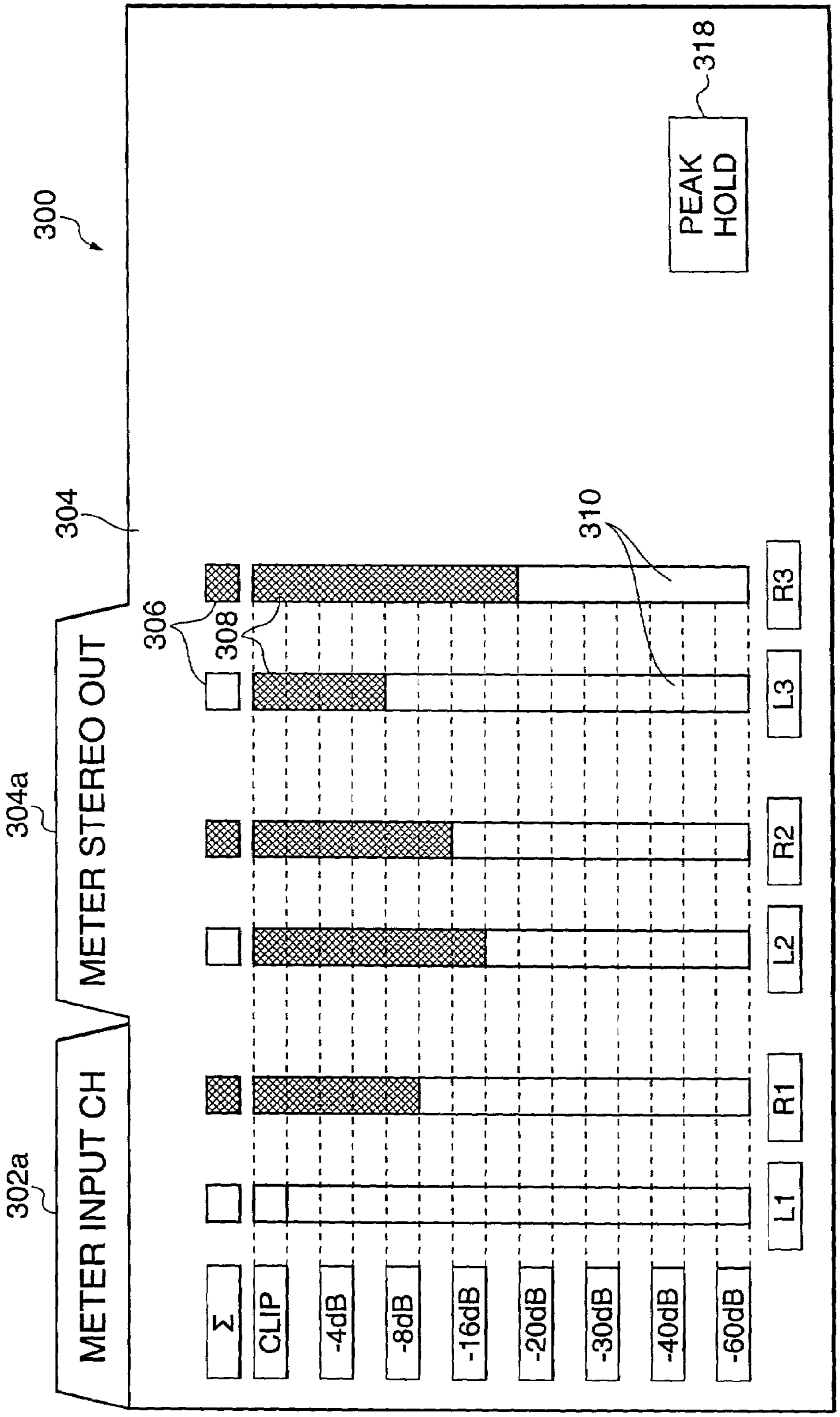
FIG. 6 is a view showing an example of display in an output channel meter window.

FIG. 6 shows a state in which the output channel meter window 304 is displayed in the meter window. In FIG. 6, the level meter 310, the clip display section 308 and the Σ display section 306 are displayed with respect to each of the metering points L1, R1, L2, R2, L3, R3 of the output channels, and the respective levels at the metering points are indicated as is the case with the input channel meter window 302. In the example shown in FIG. 6, clipping has occurred at the metering point L1, and the Σ display sections 306 at all the metering points L1, L2, L3 of the left output channel to which the metering point L1 belongs are lighted.

Figure 7:
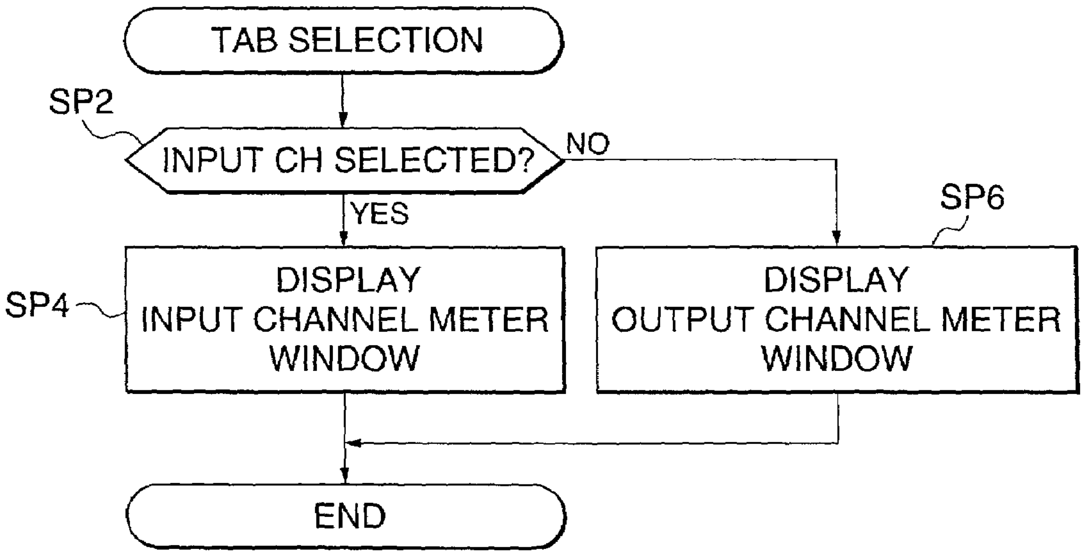
FIG. 7 is a flow chart showing a window selecting routine.

3.2 Window Selecting Routine (FIG. 7)

A description will now be given of a concrete procedure for carrying out the above described displaying process.

First, in a default state when the digital mixing apparatus has just been activated, the meter window is displayed such that the input channel meter window 302 is displayed at the forefront on the screen as shown in FIG. 3. On this occasion, if either one of the tabs 302*a*, 302*b* is clicked using the mouse included in the operating element group 125 of the console 120, a window selecting routine in FIG. 7 is started. If the program proceeds to a step SP2 in FIG. 7, it is determined whether the input channel has been selected for display or not (i.e. whether the tab 302*a* has been clicked or not).

If the determination result is positive (YES) in the step SP2, the program proceeds to a step SP4 wherein the input channel meter window 302 is displayed on the display group 126. On the other hand, the determination result is negative (NO) in the step SP2, the output channel meter window 304 is displayed on the display group 126. If either one of the windows 302, 304 is thus displayed, the routine is terminated.

Figure 8:
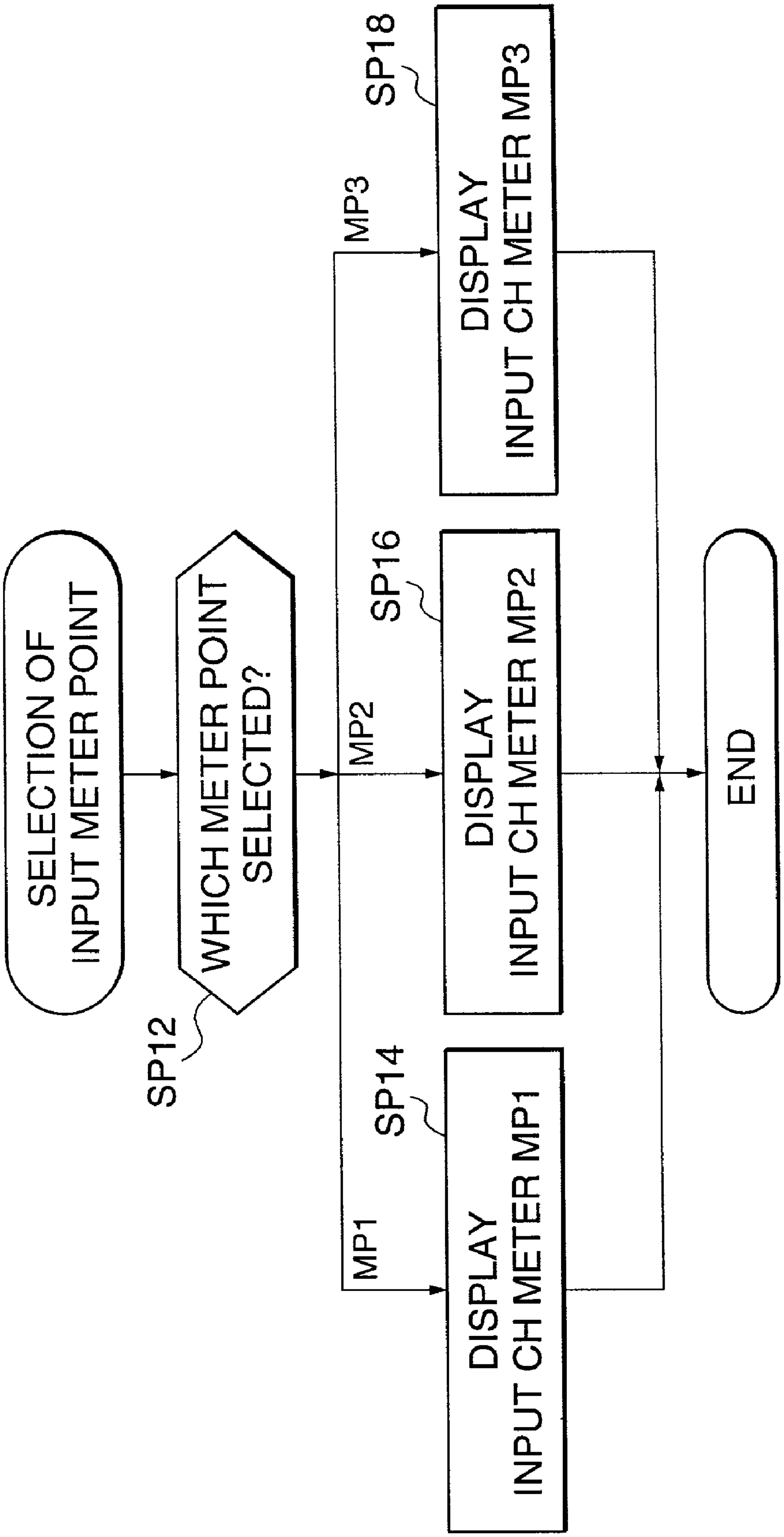
FIG. 8 is a flow chart showing an input metering point selecting routine.

3.3 Input Metering Point Selecting Routine (FIG. 8)

If any one of the metering point setting switches 312, 314, 316 is clicked using the mouse while the input channel meter window 302 is displayed, an input metering point selecting routine in FIG. 8 is started. If the program proceeds to a step SP12 in FIG. 8, it is determined which point has been selected among the metering points MP1, MP2, MP3, and the program proceeds to different steps according to the results of the determination.

First, if the metering point setting switch 312 is clicked using the mouse, it is determined that the metering point MP1 has been selected and the program proceeds to a step SP14. In the step SP14, the metering point setting switch 312 is lighted, and the contents of the level meter 310 and the clip display section 308 are set according to the result of level metering at the metering point MP1 in each input channel. If the metering point setting switch 314 or 316 is clicked using the mouse, the program proceeds to a step SP16 or SP18 wherein the contents of the level meter 319 and the clip display section 308 are set according to the result of level metering at the metering point MP2 or MP3 (see FIGS. 4 and 5). The routine is then terminated.

3.4. Peak Hold Switching Routine (FIG. 9)

Figure 9:
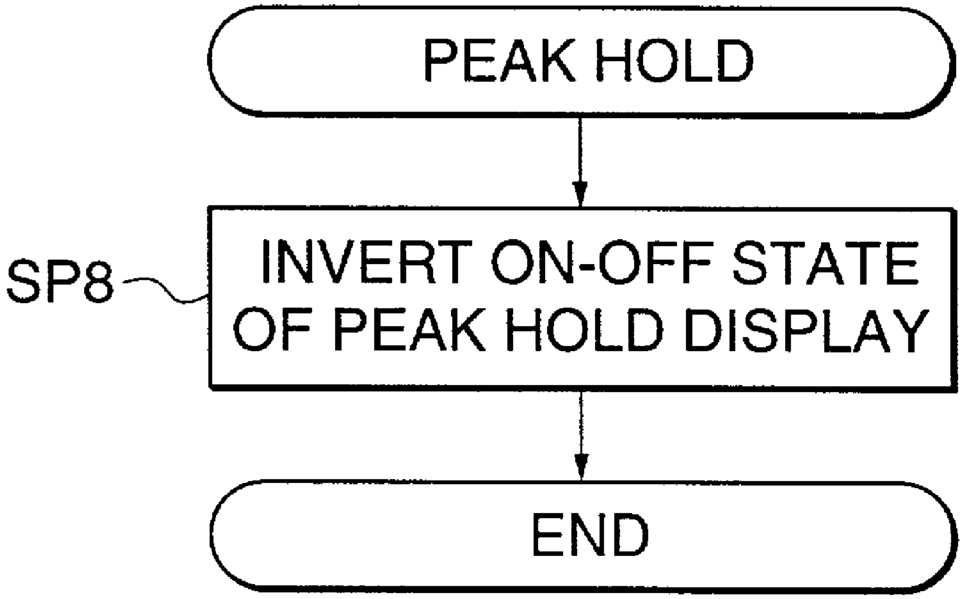
FIG. 9 is a flow chart showing a peak hold switching routine.

If the peak hold switch 318 is clicked using the mouse while either one of the windows 302, 304 is displayed, a peak hold switching routine in FIG. 9 is started. If the program proceeds to a step SP8 in FIG. 9, the on-off state of the peak hold display is inverted to terminate the routine. If the peak hold display is turned on as a result of the inversion, the peak hold switch 318 is set lighted, and if the peak hold is turned off, the peak hold switch 318 is set unlighted.

Figure 10:
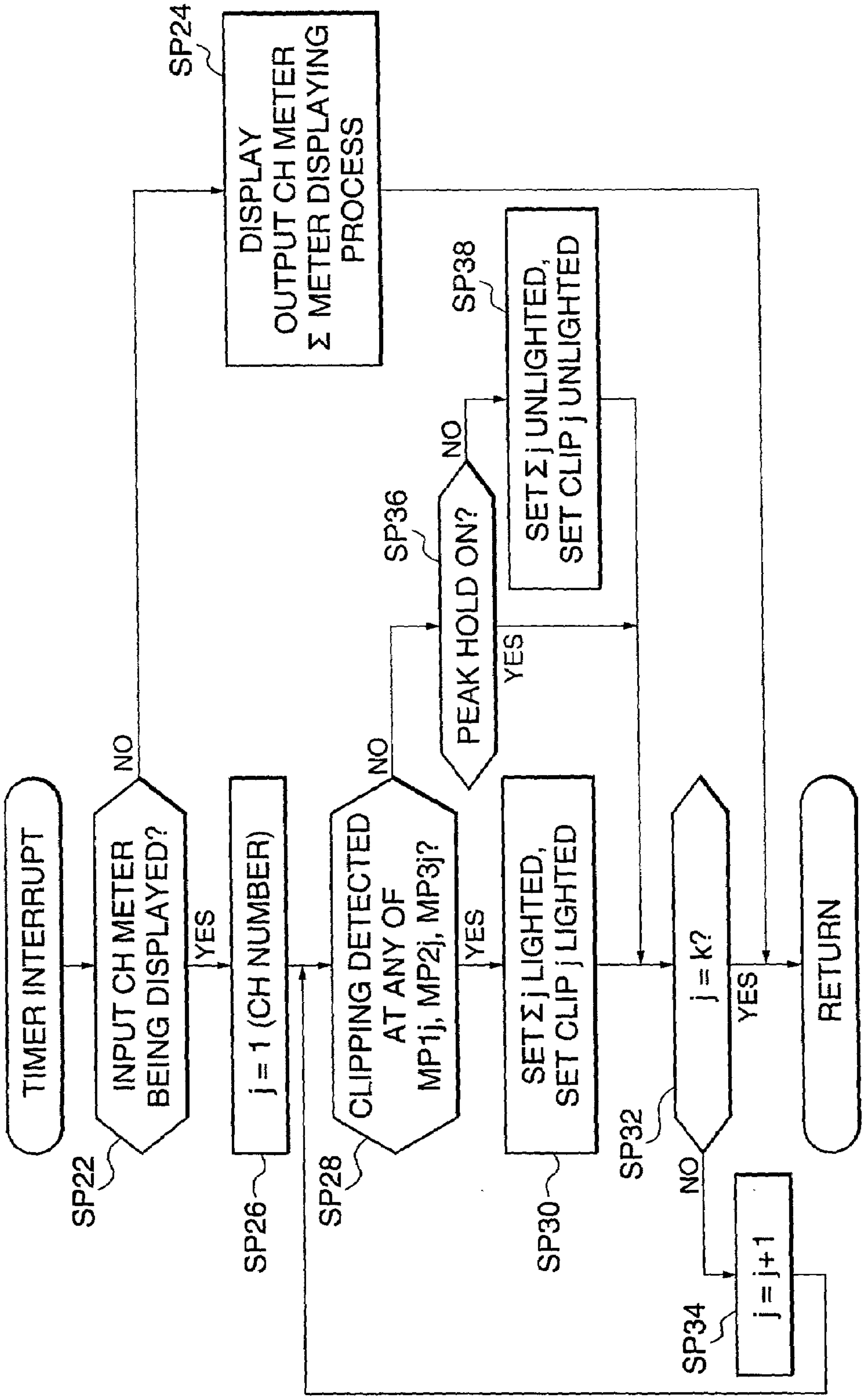
FIG. 10 is a flow chart showing a timer interruption routine.

3.5 Timer Interruption Routine (FIG. 10)

If either one of the windows 302, 304 is displayed, a timer interruption occurs in the CPU 123 at predetermined time intervals to start a timer interruption routine in FIG. 10. If the program proceeds to a step SP22 in FIG. 10, it is determined whether the input channel meter window 302 is displayed at the forefront on the screen or not. If the determination result is positive (YES), the program proceeds to a step SP26 wherein a numeral "1" is assigned to a variable (channel number) j. If the program then proceeds to a step SP28, it is determined whether or not clipping has been detected at any one of the metering points MP1, MP2, MP3 in the j th input channel.

If the determination result is positive (YES), the program proceeds to a step SP30 wherein the Σ display section 306 of the j th input channel in the input channel meter window 302 is set lighted. Further, in the step SP30, the clip display section 308 of the j th input channel at the metering point where clipping has been detected is set lighted. If the program then proceeds to a step SP32, it is determined whether the channel number j is equal to the maximum channel number k or not. If the determination result is negative (NO), the program proceeds to a step SP34 wherein the channel number j is incremented by "1" and the program returns to the step SP28.

On the other hand, if clipping has not been detected at any of the metering points MP1, MP2, MP3 in the j th input channel, the determination result is negative (NO) in the step SP28 and the program then proceeds to a step SP36. In the step SP36, it is determined whether the peak hold display is ON or not. If the determination result is negative (NO), the program proceeds to a step SP38 wherein the Σ display section 306 and the clip display section 308 of the j th input channel are set unlighted and the program then proceeds to the step SP32.

On the other hand, if the determination result is positive (YES) in the step SP36, the program proceeds to the step SP32 while skipping the step SP38. Therefore, if the peak hold display is ON and clipping has been detected at any of the metering points MP1, MP2, MP3, the Σ display section 306 of the j th input channel and the corresponding clip display section 308 are continuously set lighted. Therefore, the user can find a metering point where clipping has occurred according to the state of the Σ display section 306. The channel number j of the input channel to be processed is sequentially incremented in the step SP34, and the steps SP28 to SP38 are repeatedly executed with respect to the j th input channel. If the steps SP28 to SP38 have been repeated with respect to all the input channels, the routine is terminated.

Although the above description is based on the case where the input channel meter window 302 is displayed, a description will now be given of a case where the output channel meter window 304 is displayed. If the window 304 is displayed, the determination result is negative (NO) in the step SP22 and the program proceeds to a step SP24. In the step SP24, the same process as in the steps SP28 to SP38 is carried out with respect to the right and left output channels.

The example in FIG. 6 assumes that clipping has occurred at the metering point L1. In this case, the same process as in the step SP30 is carried out to set the display section 306 lighted at the metering points L2, L3 as well as the metering point L1 as shown in FIG. 6.

4. Variations

It should be understood that there is no intention to limit the invention to the above described embodiment, but on the contrary, the invention is to cover all modifications, alternate constructions and equivalents falling within the spirit and scope of the invention as described below.

1) Although in the above described embodiment, the present invention is applied to the digital mixing apparatus, it goes without saying that the present invention may be applied to an analog mixing apparatus. The analog mixing apparatus is implemented by removing the AD converter section 212, etc. and the DA converter sections 260, 270 in the block diagram of FIG. 2 and constructing or replacing the other respective components by analog circuits. In such an analog mixing apparatus, the level of a sound signal is monitored at the respective metering points to detect clipping state at the metering points MP1, MP2, MP3 of each input channel. If clipping is detected at any metering point, a lamp (Σ display section) corresponding to the input channel to which the metering point belongs is lighted to achieve the same effects as in the above described embodiment.

2) Although the above described embodiment assumes that the control program is executed by the CPU 123 in the console 120, the console 120 may be replaced by a universal personal computer or the like. In this case, the control program may be stored in a storage medium such as a floppy disk and a CD-ROM so that the control program can be distributed as an application program for general-purpose personal computers.

3) In the above described embodiment, the Σ display section 306 only capable of coping with clipping in the input channels is lighted while the input channel meter window 302 is displayed, and the _ display section 306 only capable of coping with clipping in the output channels is lighted while the output channel meter window 304 is displayed. The invention may be modified such that if clipping occurs in an output channel while the input channel meter window 302 is displayed, or if clipping occurs in an input channel while the output channel meter window 304 is displayed, it is possible to indicate some alarm to that effect so that the user can see it.

What is claimed is:

1. A signal processing method comprising:

an adjusting step of causing a plurality of adjusting devices that are arranged in series at a plurality of adjusting points on each of a plurality of signal paths along which sound signals that are input are transmitted, to adjust at least one of sound volume and sound quality of a corresponding one of the input sound signals at the plurality of adjusting points on each of the plurality of signal paths along which the corresponding input signal is transmitted;

a synthesizing step of causing a bus device that is connected to an output side of the plurality of signal paths, to synthesize the input sound signals that have been adjusted by the adjusting devices on the plurality of signal paths and outputted from the plurality of signal paths;

a condition determining step of determining whether the corresponding input sound signal satisfies a condition that a level of the corresponding input sound signal exceeds a predetermined value at each of a plurality of metering points on each of the plurality of signal paths along which the corresponding input sound signal is transmitted, wherein each of the adjusting points is arranged in between two adjacent ones of the plurality of metering points;

a designating step of designating one of the plurality of metering points based on a designation by a user;

a display step of causing a display device to display a current state of the input sound signals being transmitted along respective ones of the signal paths, the display device having a level display section, a first alarm display section, and a second alarm display section, said level display section, said first alarm display section, and said second alarm display section being provided for each of said plurality of signal paths;

a level displaying step of causing the level display section to display the level of the input sound signal at the designated metering point of the corresponding signal path;

a first alarm displaying step of causing the first alarm display section to display an alarm when the level of the input sound signal exceeds the predetermined value at any one of the metering points of the corresponding signal path; and a second alarm displaying step of causing the second alarm display section to display an alarm when the level of the input sound signal exceeds the predetermined value at the designated metering point of the corresponding signal path.

2. A signal processing method as claimed in claim 1, wherein the plurality of signal paths transmit the input sound signals for a plurality of channels, respectively, and said plurality of metering points are provided on the signal path of each of the plurality of channels along which a corresponding one of the input sound signals is transmitted.

3. A program executed by a computer, comprising:

an adjusting module for causing a plurality of adjusting devices that are arranged in series at a plurality of adjusting points on each of a plurality of signal paths along which sound signals that are input are transmitted, to adjust at least one of sound volume and sound quality of a corresponding one of the input sound signals at the plurality of adjusting points on each of the plurality of signal paths along which the corresponding input signal is transmitted;

a synthesizing module for causing a bus device that is connected to an output side of the plurality of signal paths, to synthesize the input sound signals that have been adjusted by the adjusting devices on the plurality of signal paths and outputted from the plurality of signal paths;

a condition determining module for determining whether the corresponding input sound signal satisfies a condition that a level of the corresponding input sound signal exceeds a predetermined value at each of a plurality of metering points on each of the plurality of signal paths along which the corresponding input sound signal is transmitted, wherein each of the adjusting points is arranged in between two adjacent ones of the plurality of metering points;

a designating module for designating one of the plurality of metering points based on a designation by a user;

a display module for causing a display device to display a current state of the input sound signals being transmitted along respective ones of the signal paths, the display device having a level display section, a first alarm display section, and a second alarm display section, said level display section, said first alarm display section, and said second alarm display section being provided for each of said plurality of signal paths;

a level displaying module for causing the level display section to display the level of the input sound signal at the designated metering point of the corresponding signal path;

a first alarm displaying module for causing the first alarm display section to display an alarm when the level of the input sound signal exceeds the predetermined value at any one of the metering points of the corresponding signal path; and a second alarm displaying module for causing the second alarm display section to display an alarm when the level of the input sound signal exceeds the predetermined value at the designated metering point of the corresponding signal path.

4. A signal processing apparatus comprising:

a plurality of signal paths along which sound signals that are input are transmitted;

a plurality of adjusting devices that are arranged in series at a plurality of adjusting points on each of said plurality of signal paths, for adjusting at least one of sound volume and sound quality of a corresponding one of the input sound signals at the plurality of adjusting points on each of said plurality of signal paths along which the corresponding input signal is transmitted;

a bus device that synthesizes the input sound signals that have been adjusted by said adjusting devices on said plurality of signal paths and outputted from said plurality of signal paths;

a condition determining device that is arranged on each of said plurality of signal paths, for determining whether the corresponding input sound signal satisfies a condition that a level of the corresponding input sound signal exceeds a predetermined value at each of a plurality of metering points on each of said plurality of signal paths along which the corresponding input sound signal is transmitted, wherein each of the adjusting points is arranged in between two adjacent ones of the plurality of metering points;

a designating device that designates one of the plurality of metering points based on a designation by a user; and a display device that displays a current state of the input sound signals being transmitted along respective ones of the signal paths, said display device having a level display section, a first alarm display section, and a second alarm display section, said level display section, said first alarm display section, and said second alarm display section being provided for each of said plurality of signal paths, wherein:

said level display section displays the level of the input sound signal at the designated metering point of the corresponding signal path;

said first alarm display section displays an alarm when the level of the input sound signal exceeds the predetermined value at any one of the metering points of the corresponding signal path; and said second alarm display section displays an alarm when the level of the input sound signal exceeds the predetermined value at the designated metering point of the corresponding signal path.

* * * * *